United States Patent
Shibata

(10) Patent No.: US 7,143,291 B1
(45) Date of Patent: Nov. 28, 2006

(54) PRINTING METHOD AND APPARATUS HAVING IMPROVED JOB SECURITY FUNCTION, AND COMPUTER PROGRAM PRODUCT EXECUTABLE BY COMPUTER FOR REALIZING IMPROVED JOB SECURITY FUNCTION

(75) Inventor: Koichi Shibata, Sakai (JP)

(73) Assignee: Minolta Co., Ltd., Osaka (JP)

( * ) Notice: Subject to any disclaimer, the term of this patent is extended or adjusted under 35 U.S.C. 154(b) by 997 days.

(21) Appl. No.: 09/726,423

(22) Filed: Dec. 1, 2000

(30) Foreign Application Priority Data

Dec. 1, 1999 (JP) ............................... 11-342087

(51) Int. Cl.
*G06K 15/02* (2006.01)
*G06F 15/00* (2006.01)

(52) U.S. Cl. .................. 713/182; 380/51; 380/243; 358/1.1; 358/1.14; 399/139; 726/2; 726/27

(58) Field of Classification Search ................ 713/202, 713/182; 358/1.1, 1.14; 380/243, 51; 399/139; 726/2, 27
See application file for complete search history.

(56) References Cited

U.S. PATENT DOCUMENTS

| | | | | |
|---|---|---|---|---|
| 5,638,511 A | * | 6/1997 | Nezu ........................... | 713/201 |
| 5,673,373 A | * | 9/1997 | Nosaki et al. ............. | 358/1.15 |
| 5,797,030 A | * | 8/1998 | Hoaby ........................... | 710/7 |
| 5,802,260 A | * | 9/1998 | Shimakawa et al. ....... | 358/1.15 |
| 5,825,988 A | * | 10/1998 | Collard et al. ............. | 358/1.13 |
| 5,869,824 A | * | 2/1999 | Okada et al. ................ | 235/380 |
| 5,956,471 A | * | 9/1999 | Ueda et al. ................. | 358/1.14 |
| 6,163,383 A | * | 12/2000 | Ota et al. ..................... | 358/1.1 |
| 6,307,640 B1 | * | 10/2001 | Motegi ....................... | 358/1.14 |
| 6,313,921 B1 | * | 11/2001 | Kadowaki ................... | 358/1.15 |
| 6,515,765 B1 | * | 2/2003 | Umebayashi ............... | 358/1.9 |
| 6,545,767 B1 | * | 4/2003 | Kuroyanagi ................ | 358/1.14 |
| 6,667,810 B1 | * | 12/2003 | Jeyachandran et al. .... | 358/1.14 |
| 2004/0008363 A1 | * | 1/2004 | Suzuki et al. .............. | 358/1.14 |
| 2004/0179223 A1 | * | 9/2004 | Iwase et al. ................ | 358/1.13 |

FOREIGN PATENT DOCUMENTS

| | | |
|---|---|---|
| JP | 0798691 | 4/1995 |
| JP | 07-125383 | 5/1995 |
| JP | 09-065148 | 3/1997 |
| JP | 11-095938 | 4/1999 |
| JP | 11170627 | 6/1999 |
| JP | 11-227267 | 8/1999 |
| JP | 11212744 | 8/1999 |

* cited by examiner

*Primary Examiner*—Taghi T. Arani
(74) *Attorney, Agent, or Firm*—Buchanan Ingersoll & Rooney PC

(57) ABSTRACT

A printing apparatus capable of preventing degradation of printer performance etc. caused by print jobs which are secured by a job security function and which are forgotten to output and accumulated in a storage device. The printing apparatus allows to cancel or output the accumulated print jobs when a prescribed password different from passwords for the job security function is entered via an operation unit thereof or from an external device connected thereto.

21 Claims, 10 Drawing Sheets

F I G. 2
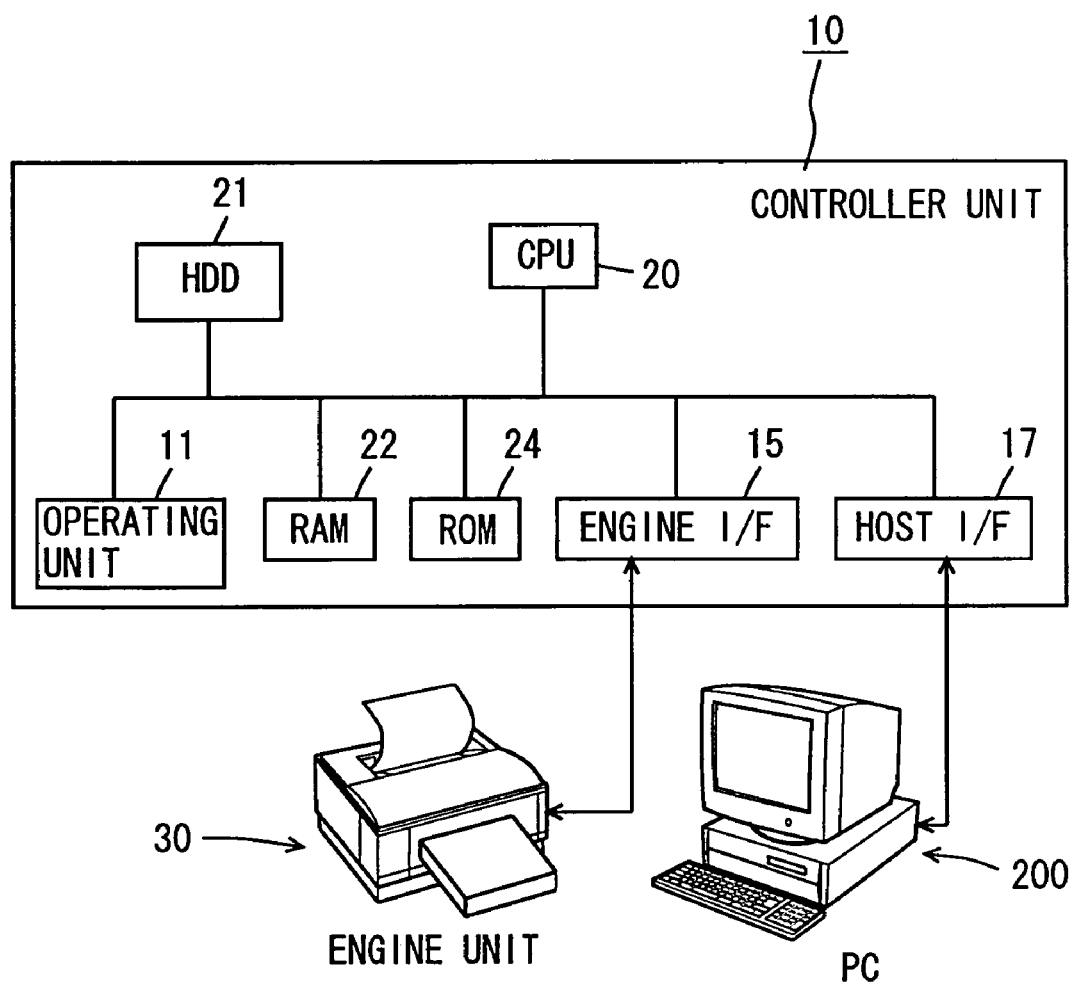

F I G. 5A

PRINT

PRINTER
PRINTER NAME (N) [ABC Laser 5000] [▼]  [PROPERTY (P)]
STATUS         IDLE
TYPE           ABC Laser 5000
COMMENT

☐ PRINT TO FILE (L)

PAGE RANGE
⦿ ALL (A)
○ CURRENT PAGE (E)
○ PAGES (G)  [          ]
ENTER PAGE NUMBERS AND/OR PAGE RANGES SEPARATED
BY COMMAS, FOR EXAMPLE, 1, 3, 6 OR 4-8

SUPER USER MODE (JOB SECURITY)
PASSWORD [        ]
JOB CANCELLATION ○        JOB OUTPUT ○

PRINT WHAT (W) [DOCUMENT] [▼]    PRINT (R)   ALL PAGES [▼]
OPTION (O)                        [ OK ]   [ CANCEL ]

WHEN DRIVER IS ACTIVATED

FIG. 5B

| PRINT | | | ?X |
|---|---|---|---|
| PRINTER | | | |
| PRINTER NAME (N) | ABC Laser 5000 ▼ | | PROPERTY (P) |
| STATUS | IDLE | | |
| TYPE | ABC Laser 5000 | | |
| COMMENT | | | ☐ PRINT TO FILE (L) |

PAGE RANGE — SUPER USER MODE (JOB SECURITY)
- ⦿ ALL (A)
- ○ CURRENT PAGE (E)    PASSWORD  *****
- ○ PAGES (G) [          ]
ENTER PAGE NUMBERS AND/OR PAGE RANGES SEPARATED    JOB                    JOB
BY COMMAS, FOR EXAMPLE, 1, 3, 6 OR 4-8              CANCELLATION ○         OUTPUT ○

PRINT WHAT (W)  [DOCUMENT ▼]           PRINT (R)     ALL PAGES ▶

[OPTION (O)]                                     [ OK ]   [ CANCEL ]

WHEN PASSWORD IS ENTERED

FIG. 5C

PRINT

PRINTER
PRINTER NAME (N)  ABC Laser 5000                    PROPERTY (P)
STATUS           IDLE
TYPE             ABC Laser 5000
COMMENT
                                          ☐ PRINT TO FILE (L)

PAGE RANGE                                SUPER USER MODE (JOB SECURITY)
◉ ALL (A)                                 PASSWORD  *****
○ CURRENT PAGE (E)
○ PAGES (G)                               JOB                    JOB
ENTER PAGE NUMBERS AND/OR PAGE RANGES SEPARATED   CANCELLATION ◉   OUTPUT ○
BY COMMAS, FOR EXAMPLE, 1, 3, 6 OR 4-8

PRINT WHAT (W)  DOCUMENT                  PRINT (R)

OPTION (O)                                   OK       ALL PAGES       CANCEL

WHEN "JOB CANCELLATION" IS SELECTED

FIG. 7

JOB SECURITY STATUS SHEET

| No. | USER NAME | DATE OF RECEPTION | FILE CAPACITY (kB) |
|---|---|---|---|
| 1 |     | '99. 10. 25 10:35 | 10 |
| 2 | AAA | '99. 10. 25 14:15 | 25 |
| 3 | BBB | '99. 10. 28 9:12 | 68 |
| 4 |     | '99. 10. 28 21:35 | 100 |
| 5 | AAA | '99. 10. 29 22:00 | 76 |
| 6 | CCC | '99. 10. 31 13:05 | 89 |
| 7 | DDD | '99. 11. 1 9:58 | 84 |
| 8 | EEE | '99. 11. 2 10:35 | 1 |
| 9 |     | '99. 11. 11 18:58 | 325 |
| 10 | BBB | '99. 10. 15 10:35 | 145 | ped# PRINTING METHOD AND APPARATUS HAVING IMPROVED JOB SECURITY FUNCTION, AND COMPUTER PROGRAM PRODUCT EXECUTABLE BY COMPUTER FOR REALIZING IMPROVED JOB SECURITY FUNCTION This application is based on Application No. 11-342087 filed in Japan, the contents of which is hereby incorporated by reference.

BACKGROUND OF THE INVENTION

1. Field of the Invention

The present invention relates to a printing apparatus, a printing method and a printing program product and, more specifically, a printing apparatus, a printing method and a printing program product with job security function.

2. Description of the Related Art

Network printers that can be connected to a plurality of personal computers (hereinafter simply referred to as "printers") often have a so-called job security function. The job security function realizes the following operation. When a print job data is transmitted from a personal computer to a printer with a password, the printer does not immediately prints the job data but prints the data out only after the password is entered from, for example, an operating unit.

Because of this job security function, the print data is output only after the password is entered. Therefore, the trouble that information of high confidentiality, for example, is printed-out immediately and possibly exposed to others, can be prevented even when the printer is shared by a plurality of users.

The job security function in accordance with the prior art, however, has the following problem. In the conventional job security function, the target print job is output only after the entrance of the password. Therefore, if a job is forgotten and left unprinted, the print job data is left in a HDD (Hard Disk Drive) or the memory such as the RAM in the printer, and such forgotten print job data would be accumulated successively.

When the accumulated print job data should occupy the memory, the printer performance degrades and, in a worst case, some functions would become unavailable.

SUMMARY OF THE INVENTION

Therefore, an object of the present invention is to provide a printing apparatus, a printing method and a printing program product that can prevent degradation of printer performance and the problem that some functions are unavailable, caused by the accumulated print job data.

The above described object of the present invention is attained by a printer apparatus in accordance with an aspect of the present invention, which includes: a receiving unit receiving a print job data and a password corresponding to the print job data; a storage device storing the print job data and the password received by the receiving unit in correspondence with each other; a password taking unit taking a password; and a controller permitting print-output of the print job data stored in the storage device in correspondence with the password, when the password taken by the password taking unit matches the password stored in the storage device in correspondence with the print job data. When the password taken by the password taking unit is a prescribed password different from the password stored in the storage device in correspondence with the print job data, the controller permits a prescribed operation on the print job data stored in the storage device.

According to the present invention, when a prescribed password different from the password stored in correspondence with the print job data in the storage device is taken by the password taking unit, a prescribed operation is performed on the stored print job data.

Therefore, unnecessary accumulation of the print job data in the storage device can be avoided by the prescribed operation. Accordingly, a printing apparatus can be provided which can prevent degradation of the printer performance and the problem that some functions become unavailable because of the accumulated print job data.

Preferably, the prescribed operation includes cancellation of the print job data stored in the storage device.

Preferably, the prescribed operation includes print-output of the print job data stored in the storage device.

In accordance with the present invention, the unnecessary print job data stored in the storage device is forced to be cancelled or output print job is executed). Therefore, occupation of the storage device by the print job data can be prevented.

Preferably, the controller permits the prescribed operation for each print job data stored in the storage device.

Therefore, the prescribed operation is performed for job by job, and hence, prescribed operation, that is, cancellation, output or the like, can be performed only on the data that is truly unnecessary.

Preferably, the password taking unit takes a password by receiving the password transmitted from an external device.

Accordingly, the password is transmitted from an external device. Therefore, it is possible for the user to operate without the necessity to go over to the printer apparatus, and it is more convenient for the user.

Preferably, the printing apparatus further includes an information taking unit taking information related to the prescribed operation, and the controller determines the contents of the prescribed operation, in accordance with the information taken by the information taking unit.

Accordingly, it becomes possible for the printing apparatus to take information related to the prescribed operation including data cancellation or output, and the contents of the prescribed operation are determined appropriately based on the information.

More preferably, the password taking unit takes a password by receiving the password transmitted from an external device, and the information taking unit takes information by receiving the information related to the prescribed operation transmitted from the external device.

According to the present invention, the password and the information related to the prescribed operation are transmitted from an external device. Therefore, it is possible for the user to operate without the necessity to go over to the printing apparatus, and hence it is more convenient for the user.

According to another aspect, the present invention provides a printing method including the steps of: receiving a print job data and a password corresponding to the print job data; storing the print job data and the password received in the step of receiving, in a storage device in correspondence with each other; taking a password; permitting, when the password taken in the step of taking matches the password stored in the storage device in correspondence with the print job data, print-output of the print job data stored in the storage device in correspondence with the password; and permitting, when the password taken in the step of taking is a prescribed password different from the password stored in the storage device in correspondence with the print job data, a prescribed operation on the print job data stored in the storage device.

According to the present invention, when a prescribed password different from the password stored in correspondence with the stored print job data is taken, a prescribed operation is performed on the stored print job data.

Therefore, unnecessary accumulation of the print job data can be avoided by the prescribed operation. Therefore, a printing method is provided that can prevent degradation in printer performance and the problem that some functions become unavailable caused by the stored print job data.

Preferably, the prescribed operation includes cancellation of the print job data stored in the storage device.

Preferably, the prescribed operation includes print-output of the print job data stored in the storage device.

In accordance with the present invention, the unnecessary print job data stored in the storage device is forced to be cancelled or output (print job is executed). Therefore, occupation of the storage device by the print job data can be avoided.

Preferably, in the step of permitting, the prescribed operation is permitted for each of the print job data stored in the storage device.

Accordingly, the prescribed operation is performed job by job. Therefore, it is possible to perform the prescribed operation of cancellation, output or the like only on the data that is truly unnecessary.

Preferably, a password is taken by receiving the password transmitted from an external device, in the step of taking.

Therefore, the password is transmitted from an external device. Thus, it is possible for the user to operate without the necessity to go over to the printing apparatus, and hence it is convenient for the user.

More preferably, the printing method includes the step of taking information related to the prescribed operation and determining contents of the prescribed operation in accordance with the taken information.

Therefore, it becomes possible to take information related to the prescribed operation including cancellation or output of the data, and the contents of the prescribed operation are appropriately determined based on the information.

More preferably, in the step of taking, a password is taken by receiving the password transmitted from an external device, and in the step of determining, information is taken by receiving the information related to the prescribed operation transmitted from an external device.

In accordance with the present invention, the password and the information related to the prescribed operation are transmitted from the external device. Therefore, it is possible for the user to operate without the necessity to go over to the printing apparatus, and hence it is more convenient for the user.

According to a still further aspect, the present invention provides a computer program product executable by a computer for printing an image, including: a receiving portion receiving a print job data and a password corresponding to the print job data; a storing portion storing the print job data and the password received by the receiving portion, in a storage device, in correspondence with each other; a password taking portion taking a password; a first controlling portion permitting, when the password taken by the password taking portion matches the password stored in the storage device in correspondence with the print job data, print-output of the print job data stored in correspondence with the password, in the storage device; and a second controlling portion permitting, when the password taken by the password taking portion is a prescribed password different from the password stored in the storage device in correspondence with the print job data, a prescribed operation on the print job data stored in the storage device.

According to the present invention, when a prescribed password different from the password stored in correspondence with the stored print job data is taken, a prescribed operation is performed on the stored print job data.

Therefore, unnecessary accumulation of the print job data can be avoided by the prescribed operation. Thus, a computer program product executable by a computer for printing an image is provided that can prevent degradation of printer performance and the problem that some functions become unavailable caused by the accumulated print job data.

Preferably, the prescribed operation includes cancellation of the print job data stored in the storage device.

Preferably, the prescribed operation includes print-output of the print job data stored in the storage device.

According to the present invention, the unnecessary print job data stored in the storage device is forced to be cancelled or output (print job is executed). Therefore, occupation of the storage device by the print job data can be avoided.

Preferably, the second controlling portion permits the prescribed operation for each of the print job data stored in the storage device.

Accordingly, the prescribed operation is performed job by job. Therefore, the prescribed operation such as cancellation or output can be performed only on the data that is truly unnecessary.

Preferably, the password taking portion takes a password by receiving the password transmitted from an external device.

Accordingly, the password is transmitted from an external device. Therefore, it is possible for the user to operate without the necessity to go over to the printing apparatus, and therefore it is convenient for the user.

Preferably, a computer program product executable by a computer for printing an image further includes an information taking portion taking information related to the prescribed operation, and the second controlling portion determines the contents of the prescribed operation in accordance with the information taken by the information taking portion.

Accordingly, it becomes possible to take information related to the prescribed operation such as data cancellation or output, and the prescribed operation is performed appropriately based on the information.

Preferably, the password taking portion takes a password by receiving the password transmitted from an external device, and the information taking portion takes information by receiving the information related to the prescribed operation transmitted from the external device.

According to the present invention, the password and the information of the prescribed operation are transmitted from the external device. Therefore, it is possible for the user to operate without the necessity to go over to the printing apparatus, and hence it is more convenient for the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram related to control performed by the controller unit of the printer shown in FIG. 1.

FIGS. 5A to 5C represent contents of the display related to a printer driver, appearing on a screen of a personal computer.

FIG. 7 shows an example of an output of a job security status sheet.

DESCRIPTION OF THE PREFERRED EMBODIMENTS

Embodiments of the present invention will be described with reference to the figures.

(1) First Embodiment

Figure 1:
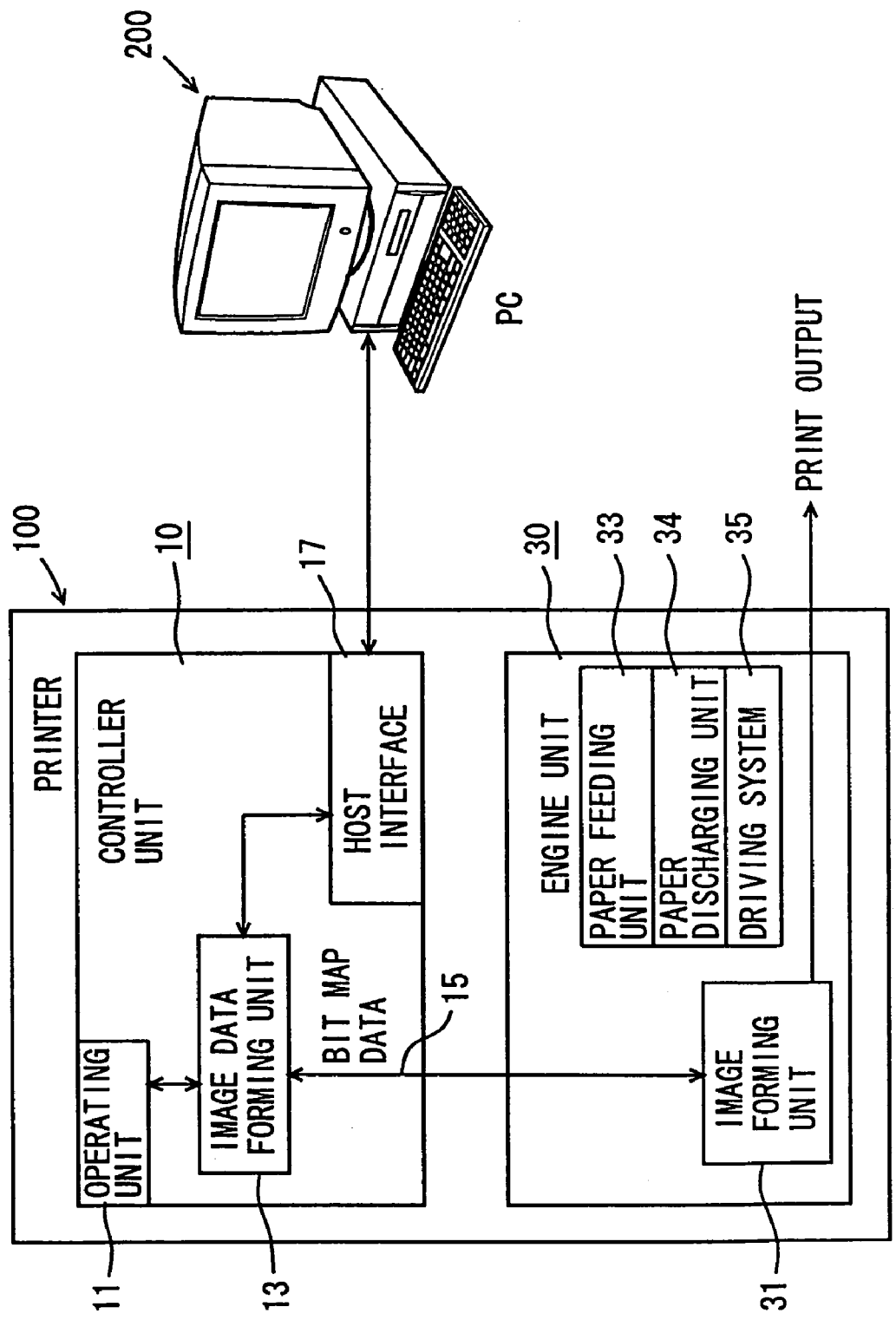
FIG. 1 is a schematic diagram representing an overall configuration of a printing apparatus in accordance with a first embodiment of the present invention.

Referring to FIG. 1, printing apparatus (hereinafter referred to as "printer") 100 mainly includes a controller unit for data processing, and an engine unit 30 for performing image formation and the like. In order to facilitate description of the job security function, a personal computer (PC) 200 connected to the printer is also depicted.

Controller unit 10 includes: an operating unit 11 by which a user operates the printer 100; a host interface (host I/F) 17 that is an interface with personal computer 200; an image data forming unit 13 converting data transmitted from personal computer 200 to bit map data (print data); and an engine interface (engine I/F) 15 that is an interface with the engine unit 30.

The engine unit 30 includes: an image forming unit 31 forming an image on a sheet of paper based on the print data transmitted through engine interface 15; a paper feed unit 33 supplying sheet of paper for printing; a paper discharging unit 34 discharging printed sheet of paper; a driving system 35 including a conveyor roller and the like.

As to the method of image formation by the image forming unit 31, a common electrophotography using laser or LED (Light Emitting Diode), ink jet method or the like may be adopted.

From personal computer 200, print job data and a password in correspondence therewith for executing the print job, which are transmitted to printer 100.

FIG. 2 is a block diagram representing control by the controller unit 10 in printer 100 shown in FIG. 1. Referring to FIG. 2, controls performed when the common print job in accordance with the job security function is executed will be described.

CPU (Central Processing Unit) 20 temporarily stores the print job data and the password for executing the job transmitted from personal computer 200 for job security in a HDD 21, in accordance with a control program stored in an ROM 24, and waits for an entrance of a password by the user through the operating unit 11.

When a password matching the password transmitted from personal computer 200 is entered, the stored print job corresponding to the password is executed and the data is printout. More specifically, the print job data stored in HDD 21 is read, the print job data is converted to bit map data at the image data forming unit 13, and the bit map data is transmitted to image forming unit 31 of engine unit 30 through engine I/F 15. Printing is done (image is formed) on a sheet of paper based on the bit map data, and the printed sheet is discharged.

When the matching password is not entered, the print job data is kept stored in the HDD 21. When the print job data for which password is not entered increases because of such failure of output, the print job data are accumulated successively in the HDD 21, occupying HDD 21.

Control in the super user mode, in which the print job data secured by the job security is operated forcefully, will be described.

CPU 20 enters the super user mode, when a prescribed password allowing entrance to the super user mode (different from the password designated by PC 200 to execute the print job) is entered.

In the super user mode, it is possible to cancel or output the print job data that is kept stored in the HDD 21. More specifically, when cancellation or output of the print job is selected at the operating unit 11, CPU 20 reads the print job data from HDD 21 in accordance with the selected contents of operation, and cancels or outputs the read data.

Therefore, it becomes possible to clear the print job data, which has been stored, away from the HDD 21.

Figure 3:
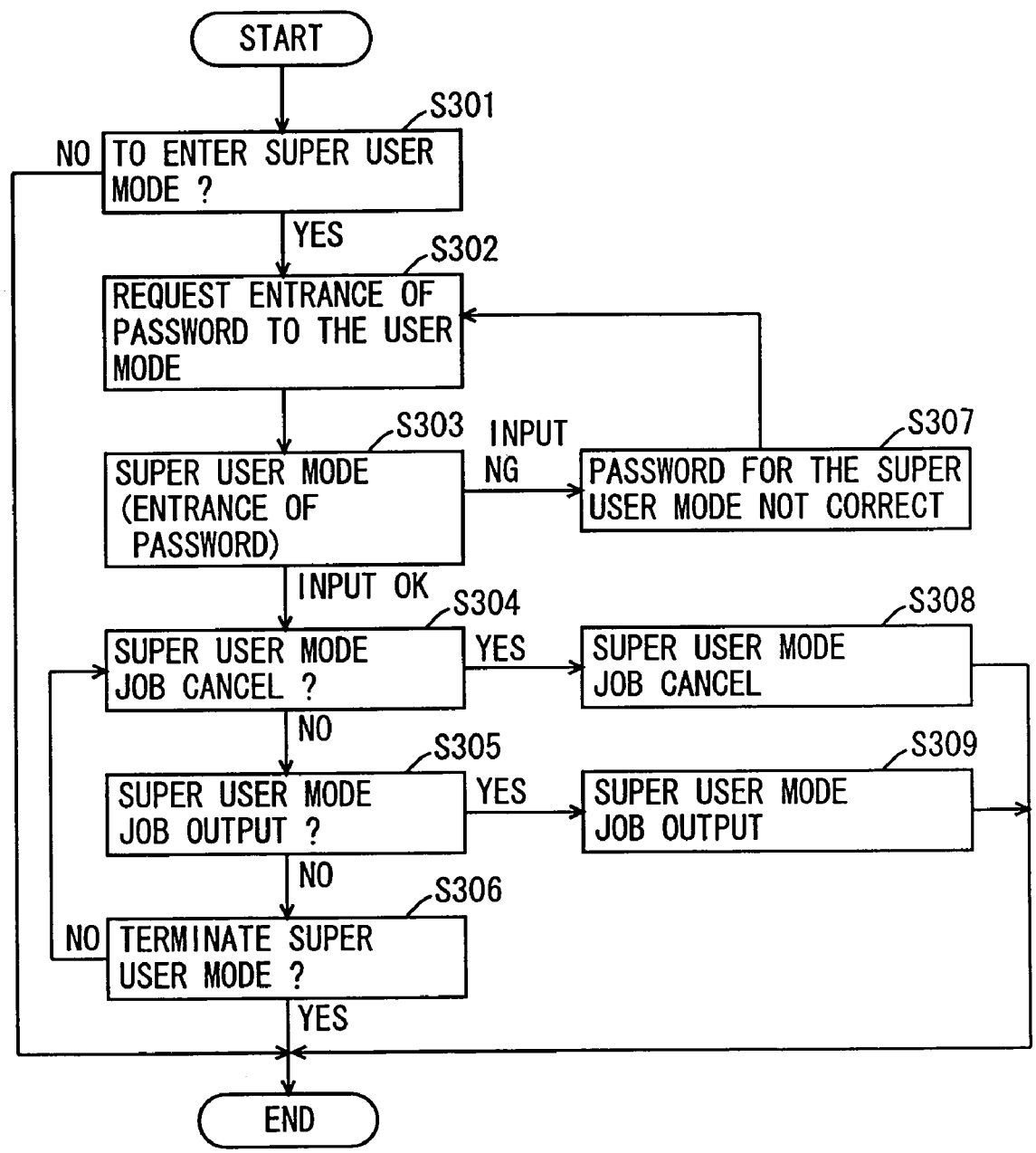
FIG. 3 is a flow chart representing the process flow of the printer in a super user mode.

The process flow in the printer 100 in accordance with the present embodiment will be described with reference to FIG. 3. FIG. 3 is a flow chart representing the process flow of the printer 100 in the super user mode. CPU 20 performs the following process in accordance with a program stored in ROM (Read Only Memory) 24. The contents of respective process steps correspond to displays appearing on LCD (Liquid Crystal Display) screen or the like, of the operating unit 11.

When the super user mode is to be entered ("Yes" in step S301), entrance of a password is requested (step S302), and a prescribed password is entered through ten keys and the like (step S303). If the password fails, a message to that effect appears (step S307), and a dialogue requesting the password again appears (step S302).

When a correct password is entered ("OK" in step S303), a dialogue requesting selection as to whether the print job is to be canceled appears (step S304). If job cancellation is selected ("Yes" in step S304), the print job data that has been stored in HDD 21 is cancelled (step S308).

When job cancellation is not selected ("NO" in step S304), a dialogue asking whether the print job is to be output or not appears (step S305).

When job output is selected ("Yes" in step S305), printing is performed in accordance with the print job data that has been stored in HDD 21 (step S309).

When the job output is not selected ("No" in step S305), a dialogue asking whether the super user mode is to be terminated appears (step S306). When termination is selected ("Yes" in step S306), the program exits the super user mode, and the process terminates.

If termination is not selected ("No" in step S306), the flow returns to the process of step S304, and the series of operations are repeated.

In this manner, when the prescribed password is entered through the operating unit 11, the program enters the super user mode, in which it is possible to collectively cancel or output the print job data stored in the HDD 21. Thus, troubles caused by memory occupation by the accumulated unnecessary print jobs can be avoided.

(2) Second Embodiment

The print system in accordance with the second embodiment of the present invention will be described. The print system in accordance with the second embodiment includes the printer 100 and personal computer 200 shown in FIG. 1. The print system in accordance with the second embodiment, however, is different from the first embodiment in that the password entrance and the like to enter the super user mode are performed not through the operating unit 11 of the printer 100 but from the personal computer 200.

Figure 4:
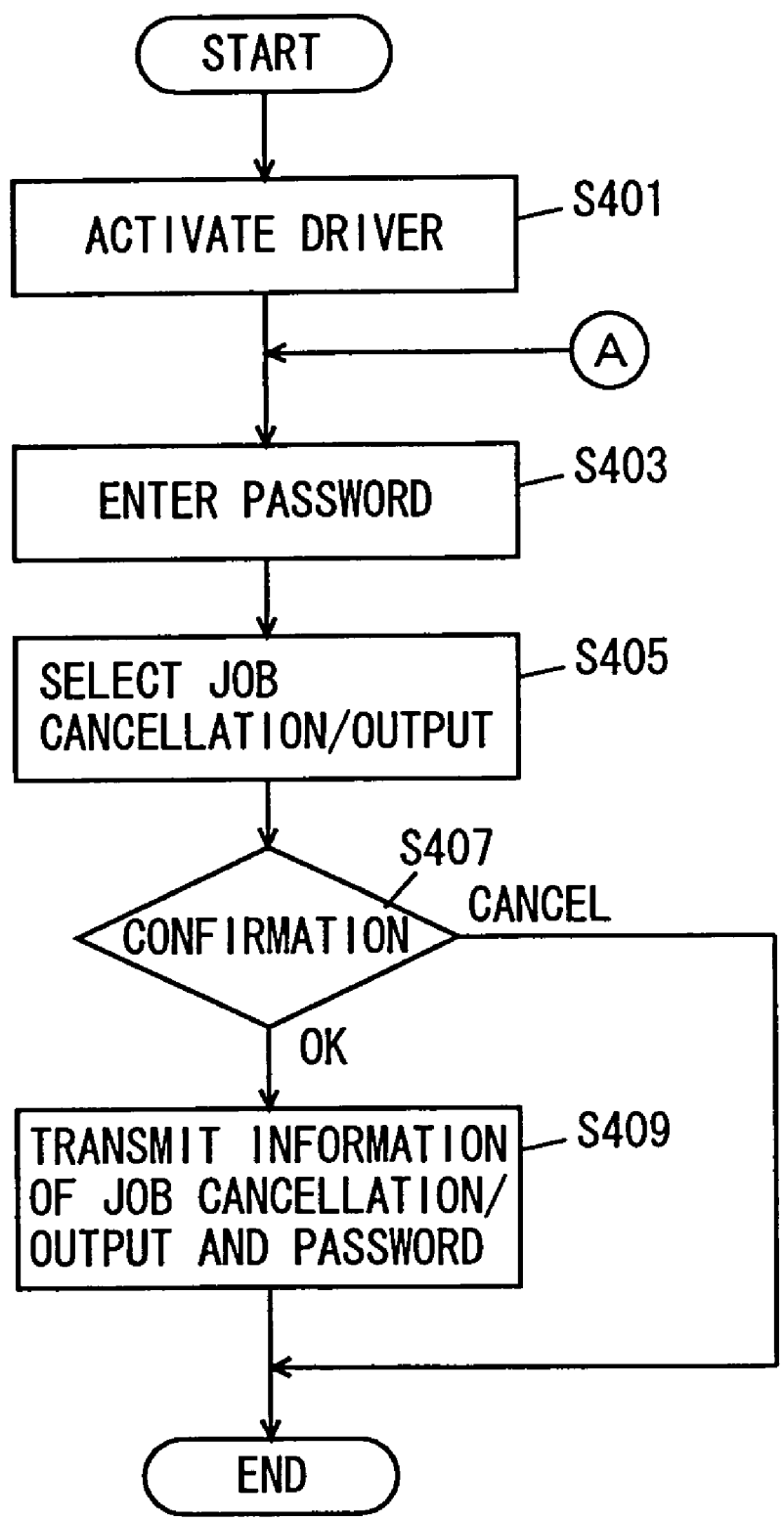
FIG. 4 is a flow chart representing an input process flow on the side of a personal computer, to enter the super user mode.

The process flow in the print system in accordance with the second embodiment will be described with reference to FIGS. 4 to 6. FIG. 4 is a flow chart representing the flow of input process on the side of the personal computer 200 performed to enter the super user mode. Personal computer 200 executes the following input process, in accordance with a program (printer driver) stored in a recording medium such as an ROM, a hard disk, a CD-ROM (Compact Disk-Read Only Memory) or the like, not shown. FIGS. 5A to 5C represent contents of display related to the printer driver, appearing on the screen of personal computer 200.

Referring to FIG. 4 and FIGS. 5A to 5C, in personal computer 200, first, the printer driver is activated in step S401. Here, a window such as shown in FIG. 5A appears on the screen.

Referring to FIG. 5A, here, in addition to the indication "printer", "page range" and the like for setting the normal print job, there appears the indication of "super user mode" for the job security function. A password input box for entering password and buttons to select either the job cancellation or job output are included.

In step S403, a password is entered. More specifically, referring to FIG. 5B, a prescribed password is entered in the password input box. In step S405, an operation for the print job is selected. More specifically, referring to FIG. 5C, either the job cancellation or job output is selected by the selection buttons. Here, job cancellation is selected, as an example.

In step S407, the input password and the selected job operation are confirmed. More specifically, the input contents are confirmed by selecting the button "OK" or "Cancel" on the lower right corner of FIG. 5C.

When "Cancel" is selected, the input password and the contents of the selected forced operation, that is, "job cancellation" or "job output" are invalidated, and the process terminates. By contrast, when "OK" is selected, the flow proceeds to step S409, in which the input password and the information of cancellation or output of the print job are transmitted to printer 100. The input operation from the side of personal computer 200 thus terminates.

Figure 6:
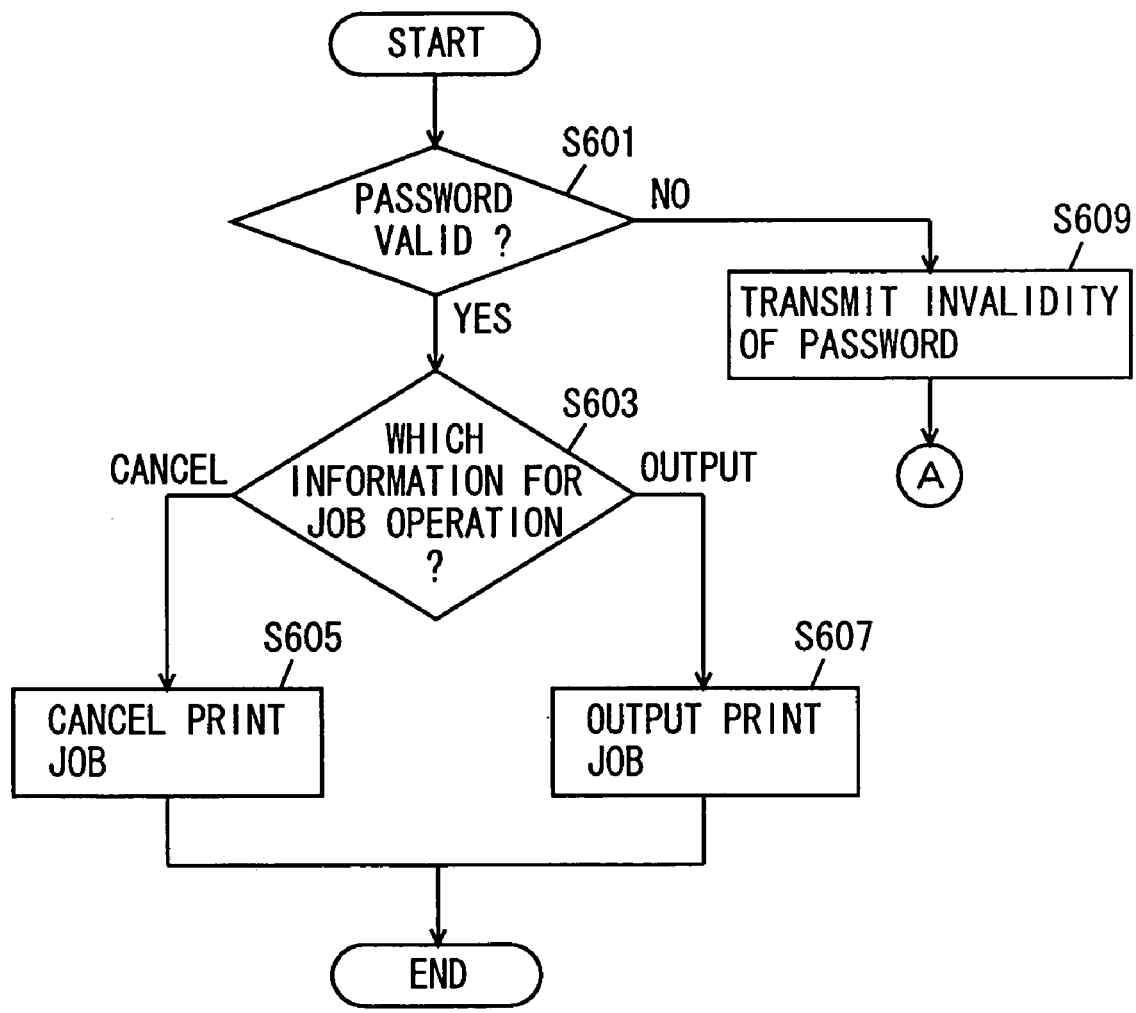
FIG. 6 is a flow chart representing a process flow on the side of the printer to enter the super user mode.

FIG. 6 is a flow chart representing the process flow on the side of printer 100 to enter the super user mode. CPU 20 executes the following process in accordance with the program stored in ROM 24. Referring to FIG. 6, first, in step S601, whether the password transmitted from personal computer 200 is valid or not is determined.

When it is determined that the password is invalid, the process proceeds to step S609, and information that the password in invalid is transmitted to personal computer 200. Therefore, the information of cancellation or output of the print job input from personal computer 200 is also invalidated, and the operation of job cancellation or the like is not performed.

Returning to step S403 of FIG. 4, the password input process starts again. Unless canceled, the processes following the step S403 of FIG. 4 are repeated until a correct password is entered.

When it is determined that the password is valid in step S601, the process enters the super user mode. In step S603, the transmitted operation information is read, and whether the information of forced operation for the job is job cancellation or job output is determined.

If it is determined to be job cancellation, in step S605, the print job data is canceled. If it is determined to be job output, the print output in accordance with the print job data is made in step S607.

In accordance with the process described above, it is possible to enter the super user mode by an input operation of a password and the like through personal computer 200. Therefore, it is possible to collectively cancel or output the unnecessary print jobs kept in HDD 21, without the necessity to go over to the printer 100. Thus, occupation of the memory by the print jobs can be avoided, and it becomes possible to prevent degradation of printer performance and the problem that some functions become unavailable.

(3) Third Embodiment

Finally, a printer in accordance with the third embodiment of the present invention will be described. The printer in accordance with the third embodiment is, in the schematic configuration, similar to printer 100 in accordance with the first embodiment. The difference is that a print job that can be operated in a forced manner can be selected in the super user mode.

In the first embodiment, when there are a plurality of print job data stored in HDD 21, the print job data are canceled or output collectively in the super user mode. By contrast, in the present embodiment, it is possible for the user to arbitrarily select and cancel or output any of the plurality of print job data.

Assume that there are a plurality of print job data stored in HDD 21, and that some of the print jobs are to be canceled and some of others are to be output. In such a case, first, in order to obtain information as to what print jobs are stored in what number, it is possible for the user to obtain an output a job security status sheet, as one of a printer status sheets.

FIG. 7 shows an example of the output job security status sheet. Referring to FIG. 7, the job security status sheet includes descriptions of job numbers, user names, date of reception, file capacity and so on.

The job number is a number allocated to a job in the order of reception, and the user name refers to, for example, a host machine (here, personal computer) from which the job is transmitted, and it is described when the user name is appended to each print job. The file capacity represents the capacity occupied by the print job of HDD 21 or the like.

The user refers to the job security status sheet, so as to identify the job number to be canceled and the job number to be output. At the time of setting the job number, which will be described later, the user may enter the desired job number obtained from this sheet.

Figure 8:
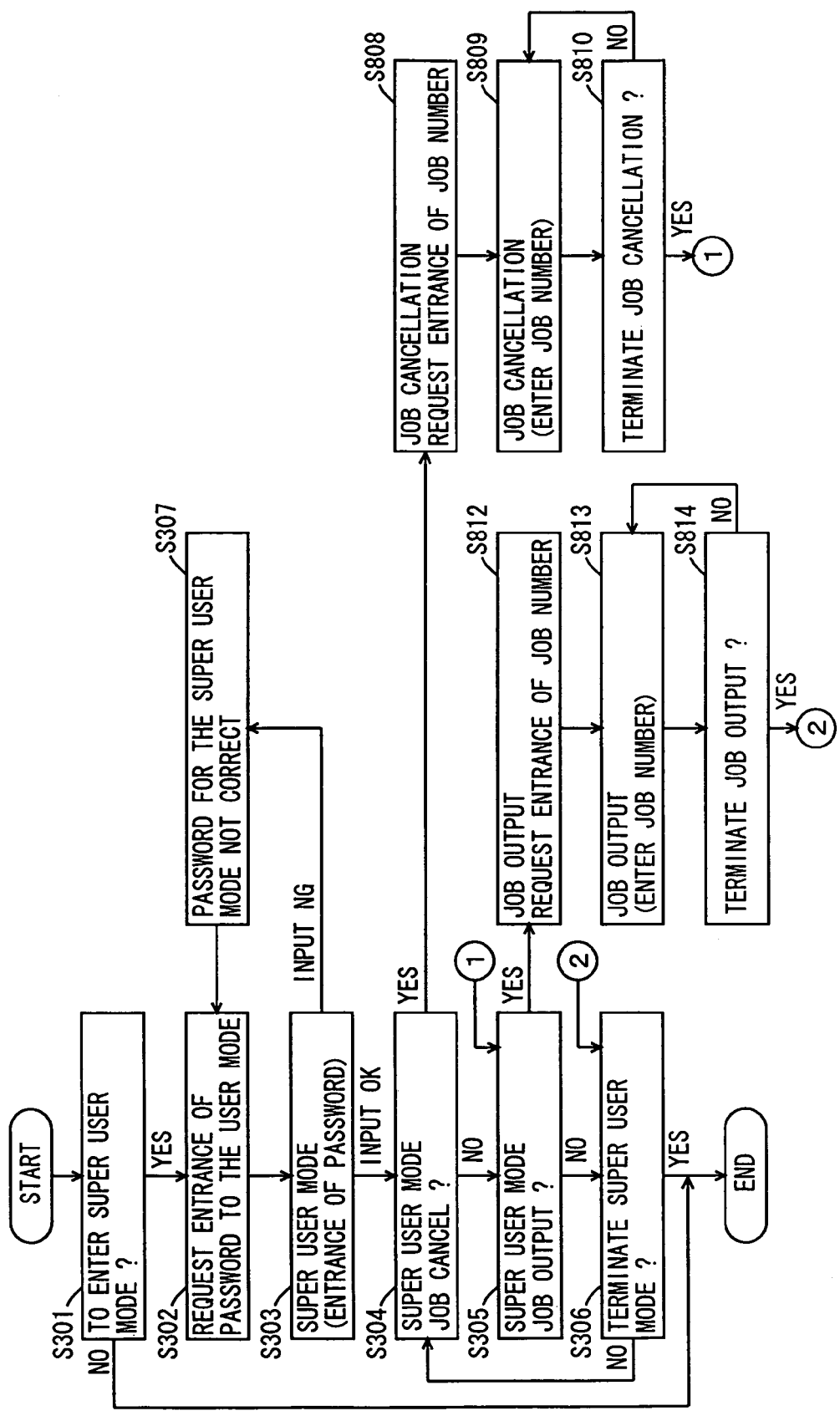
FIG. 8 is a flow chart representing a process flow of a printer capable of job output or job cancellation on an arbitrary job.

FIG. 8 is a flow chart representing a process flow of the printer that is capable of job output or job cancellation of an arbitrary job, in accordance with the third embodiment. The CPU 20 executes the following processing in accordance with the program stored in ROM 24. The contents of respective process steps correspond to the displays appearing on the LCD screen or the like of operating unit 11.

Referring to FIG. 8, the process step to enter the super user mode (steps S301 to S304 and S307) are the same as the steps S301 to S304 and S307 shown in FIG. 3.

More specifically, when a correct password is entered through operating unit 11 ("OK" in step S303), the process enters the super user mode, and a dialogue asking whether the print job is to be canceled or not appears (step S304). The process following this step differs from that of FIG. 3.

More specifically, when job cancellation is selected ("Yes" in step S304), input of the print job number that should be canceled is requested (step S808), and the user inputs the number of the print job that is to be canceled, with reference to the job security status sheet shown in FIG. 7 (step S809). When the input of job number ends, a dialogue appears, asking whether cancellation process is to be terminated or not (step S810).

When the cancellation process is not to be terminated ("No" in step S810), the user again enters the number of the print job that is to be canceled (step S809). In this manner, when there are a plurality of job numbers to be canceled, the user continuously enters the print job numbers to be canceled.

When there remains no other print job to be canceled, termination of the cancellation process is selected ("Yes" in step S810), and thereafter, a dialogue asking whether the print job is to be output or not appears (step S305).

When the print job output is selected ("Yes" in step S305), input of the print job number to be output is requested (step S812), and the user enters the print job number to be output, with reference to the job security status sheet shown in FIG. 7 (step S813). When entrance of the job number ends, a dialogue again appears asking whether the output process should be terminated or not (step S814).

When the output process is to be continued ("No" in step S814), the print job number to be output is again entered (step S813). In this manner, when there are a plurality of job numbers to be output, the user continuously enters the print job numbers to be output.

When there remains no other print job to be output, termination of the output process is selected ("Yes" in step S814). Then, a dialogue appears asking whether the super user mode is to be terminated or not (step S306). If termination is selected ("Yes" in step S306), the process exits from the super user mode, and the process terminates.

If termination is not selected ("No" in step S306), the process returns to step S304, and the above described series of process operations are repeated.

In this manner, when a prescribed password is entered, the process enters the super user mode, in which it is possible to perform an arbitrary selected desired operation on the print job data stored in HDD 21. More specifically, it is possible to pick up and cancel or output desired jobs among a plurality of print jobs. Therefore, when there are a plurality of print jobs that are to be canceled and to be output existing mixedly, or when there are a plurality of print jobs that are to be canceled or output and that are not to be canceled or output but to be stored existing mixedly, appropriate processing is possible.

Though a process flow to enter the super user mode through the operating unit 11 of printer 100 has been described here, it is possible to enter the super user mode from personal computer 200. In that case, entrance of the password, selection of job cancellation or job output, and the entrance of the object print job number are performed through the printer driver, and the information is transmitted to printer 100. Upon reception of the information, printer 100 cancels or outputs the corresponding print job, in accordance with the received contents, if the password is correct.

As described above, in the printing apparatus in accordance with the present invention, it is possible to output or cancel in a forced manner, a print job that is left by failure or just forgotten and accumulated in the HDD 21. Therefore, degradation of printer performance or the problem that some functions become unavailable because of memory occupation can be avoided.

Further, the super user mode can be entered only when a special password is entered, different from the normal password. Therefore, the user who can perform the forced operation on the print job is limited. That is, the forced operation is not freely possible for an unspecified number of users. Therefore, high security is ensured.

Further, the operation of entering the super user mode and applying the information related to the forced operation can be done not only through the operating unit 11 of printer 100 but also from a driver on personal computer 200, and hence, good user interface is provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for printing an image, comprising:
   a receiving unit receiving print job data and a password transmitted with the print job data;
   a storage device storing the print job data and the password received by said receiving unit in correspondence with each other;
   a password accepting unit that accepts a password; and
   a controller permitting, when the password accepted by said password accepting unit matches the password stored in said storage device in correspondence with the print job data, print output of the print job data stored in said storage device in correspondence with said password; wherein
   said controller permits, when the password accepted by said password accepting unit is a prescribed password different from the password stored in said storage device in correspondence with the print job data, a prescribed operation on the print job data stored in said storage device.

2. The apparatus for printing an image according to claim 1, wherein
   said prescribed operation includes cancellation of the print job data stored in said storage device.

3. The apparatus for printing an image according to claim 1, wherein
   said prescribed operation includes print output of the print job data stored in said storage device.

4. The apparatus for printing an image according to claim 1, wherein
   said controller permits said prescribed operation for each print job data stored in said storage device.

5. The apparatus for printing an image according to claim 1, wherein
   said password accepting unit accepts a password by receiving the password transmitted from an external device.

6. The apparatus for printing an image according to claim 1, further comprising
an information taking unit taking information related to said prescribed operation; wherein
said controller determines contents of said prescribed operation in accordance with the information taken by said information taking unit.

7. The apparatus for printing an image according to claim 6, wherein
said password accepting unit accepts a password by receiving the password transmitted from an external device; and
said information taking unit takes information by receiving the information related to said prescribed operation transmitted from said external device.

8. A method of printing an image, comprising the steps of:
receiving print job data and a password transmitted with the print job data;
storing the print job data and the password received in said step of receiving, in a storage device in correspondence with each other;
accepting a password;
permitting, when the password accepted in said accepting step matches the password stored in said storage device in correspondence with the print job data, print output of the print job data stored in said storage device in correspondence with said password; and
permitting, when the password accepted in said accepting step is a prescribed password different from the password stored in said storage device in correspondence with the print job data, a prescribed operation on the print job data stored in said storage device.

9. The method of printing an image according to claim 8, wherein
said prescribed operation includes cancellation of the print job data stored in said storage device.

10. The method of printing an image according to claim 8, wherein
said prescribed operation includes print output of the print job data stored in said storage device.

11. The method of printing an image according to claim 8, wherein
in said step of permitting a prescribed operation, said prescribed operation is permitted for each print job data stored in said storage device.

12. The method of printing an image according to claim 8, wherein
in said accepting step, a password is accepted by receiving the password transmitted from an external device.

13. The method of printing an image according to claim 8, further comprising the step of taking information related to said prescribed operation and determining contents of said prescribed operation in accordance with the taken information.

14. The method of printing an image according to claim 13, wherein
in said accepting step, a password is accepted by receiving the password transmitted from an external device; and
in said step of determining, information is taken by receiving the information related to said prescribed operation transmitted from said external device.

15. A computer-readable storage medium containing a computer program product executable by a computer for printing an image, comprising:
receiving means for receiving a print job data and a password to transmitted with the print job data;
storing means for storing the print job data and the password received by said receiving means in a storage device in correspondence with each other;
password accepting means for accepting a password;
first controlling means for permitting, when the password accepted by said password accepting means matches the password stored in said storage device in correspondence with the print job data, print output of the print job data stored in said storage device in correspondence with said password; and
second controlling means for permitting, when the password accepted by said password accepting means is a prescribed password different from the password stored in said storage device in correspondence with the print job data, a prescribed operation on the print job data stored in said storage device.

16. The computer program product according to claim 15, wherein
said prescribed operation includes cancellation of the print job data stored in said storage device.

17. The computer program product according to claim 15, wherein
said prescribed operation includes print output of the print job data stored in said storage device.

18. The computer program product according to claim 15, wherein
said second controlling means permits said prescribed operation for each print job data stored in said storage device.

19. The computer program according to claim 15, wherein
said password accepting means accepts a password by receiving the password transmitted from an external device.

20. The computer program product according to claim 15, further comprising
information taking means for taking information related to said prescribed operation; wherein
said second controlling means determines contents of said prescribed operation in accordance with said information taken by said information taking means.

21. The computer program product according to claim 20, wherein
said password accepting means accepts a password by receiving the password transmitted from an external device; and
said information taking means takes information by receiving the information related to said prescribed operation transmitted from said external device.

* * * * *